Dec. 15, 1925.
H. FLICK
1,565,920
TESTING MACHINE FOR WHEELS
Filed Oct. 4, 1921
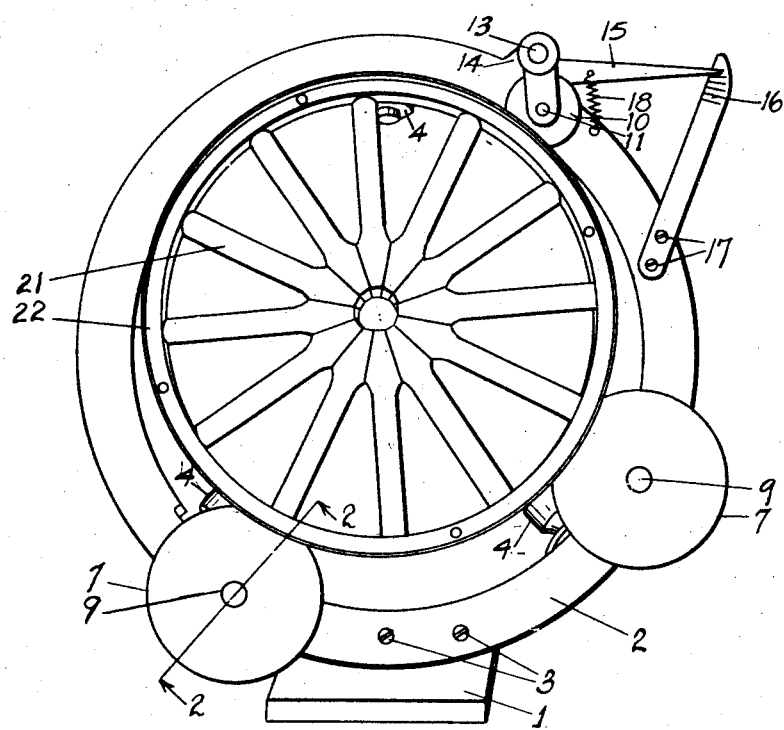
Fig. I.
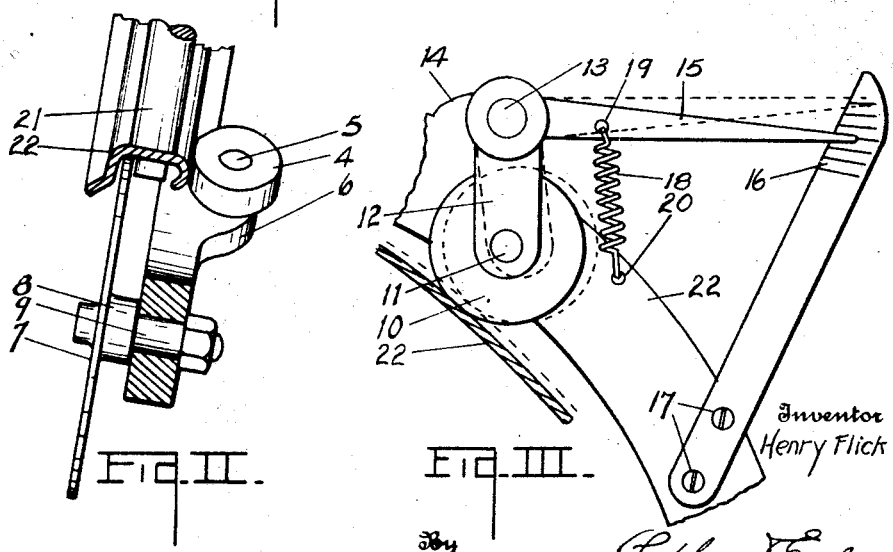
Fig. II.    Fig. III.
Inventor
Henry Flick Patented Dec. 15, 1925.

1,565,920

UNITED STATES PATENT OFFICE.

HENRY FLICK, OF JACKSON, MICHIGAN, ASSIGNOR TO HAYES WHEEL COMPANY, OF JACKSON, MICHIGAN.

TESTING MACHINE FOR WHEELS.

Application filed October 4, 1921. Serial No. 505,245.

*To all whom it may concern:*

Be it known that I, HENRY FLICK, a citizen of the United States, residing at the city and county of Jackson, State of Michigan, have invented certain new and useful Improvements in Testing Machines for Wheels, of which the following is a specification.

This invention relates to an improved testing machine for wheels.

The object of the invention is to provide a simple and effective means of determining whether or not the periphery of a wheel is a true circle or substantially so and indicating the extent of variation.

Objects relating to details and economies of construction and operation will definitely appear from the detailed description to follow.

The objects of the invention are accomplished by the devices and means described in the following specification. The invention is clearly defined and pointed out in the claims.

A structure which is a preferred embodiment of the invention is fully illustrated in the accompanying drawing, forming a part of this application, in which:

Fig. I is a detail perspective view of the improved testing machine with a wheel in position for testing.

Fig. II is an enlarged detail sectional view taken on line 2—2 of Fig. I, showing the relation of the supporting rollers and of the fixed contact testing disks.

Fig. III is an enlarged detail sectional view of the yielding movable testing disk and indicator.

In the drawing similar reference numerals refer to similar parts throughout the several views.

Considering the numbered parts of the drawing by their numbers, 1 is the base, 2 is an inclined annular support secured thereto by screws 3. Supporting anti-friction rollers 4 are disposed on radial pivots 5 carried by lugs 6 within the inner wall of the ring. Two thin disks 7 with supporting hubs 8 are revoluble upon pins 9 which are at right angles to the inclined face of the said annular table 2. The plane of the disks 7 is parallel to the face of the said tables.

A third disk 10 revolves on pivot 11 carried by arm 12 in position to yieldingly contact with the felly of a wheel in the same plane as the disk 7. The arm 12 is pivotally supported on the pivot 13 which is carried by a lug 14 on the periphery of the annular table 2. A pointer 15 is radially secured to the arm 12 and extends to a scale 16 which is secured to the face of the plate by screws 17.

A coiled spring 18 is connected to the pointer 15 at the perforation 19 and to the table at the perforation 20 reacting to rock the yielding disk 10 towards any wheel that may be in the machine to be tested.

A wheel 21 with metallic felly 22 is shown in the machine. The outer side of the felly is carried by the rollers 4 and the disks 7, 7 and 10 contact with the wheel at a line just inside the inner flange and between it and the ends of the spokes.

It will be seen that the contact points of the periphery of the wheel with the disks 7, 7 and 10 would constitute three points in a true circle, and on the revolution of the wheel on the supporting testing disks 7 any inequalities would result in movement of the disk 10 out and in, thereby moving the pointer correspondingly to show any irregularity in the circle of the circumference of the wheel.

In practice the wheel is rotated until it shows the high spot and it is struck with a hammer or mallet at that point and tested again, it being possible to correct the inequalities of a large number of wheels at the time of inspection by one or two blows.

The invention is shown in a very simple form. The table being inclined greatly facilitates the placing of the wheel and the easy rotation of the same. However, the structure is capable of very considerable variation without departing from the invention, and it is desired to claim the invention specifically and broadly as pointed out in the appended claims.

Having thus described the invention what is claimed as new and desired to secure by Letters Patent, is:

1. The combination of an inclined annular frame with a suitable support, with supporting rollers having their axes radially disposed on said support and radial pivots for said rollers disposed within the inner margin of the frame, a pair of revoluble testing disks disposed on the lower part of the frame parallel to the front face thereof, and supporting pins at right angles to the front face of said frame for said disks, a movable rotary disk supported on the upper part of the frame in the same plane as said pair of disks, a swinging arm on said frame carrying the said movable disk, an indicator pointer connected to the said arm, and a tension spring between the said finger and frame for forcing the disk yieldingly into contact with any wheel being tested, coacting as specified.

2. The combination of an inclined annular frame with a suitable support, with supporting rollers having their axes radially disposed on said support and radial pivots for said rollers disposed within the inner margin of the frame, a pair of revoluble testing disks disposed on the lower part of the frame parallel to the front face thereof, and supporting pins at right angles to the front face of said frame for said disks, a movable rotary disk supported on the upper part of the frame in the same plane as said pair of disks, a swinging arm on said frame carrying the said movable disk, and an indicator to show movement of said disk to indicate irregularity of the wheel, coacting as specified.

In witness whereof, I have hereunto set my hand and seal.

HENRY FLICK. [L. S.]